Dec. 10, 1929.    R. H. CHILTON    1,739,025
SPRING SHACKLE
Filed March 29, 1927
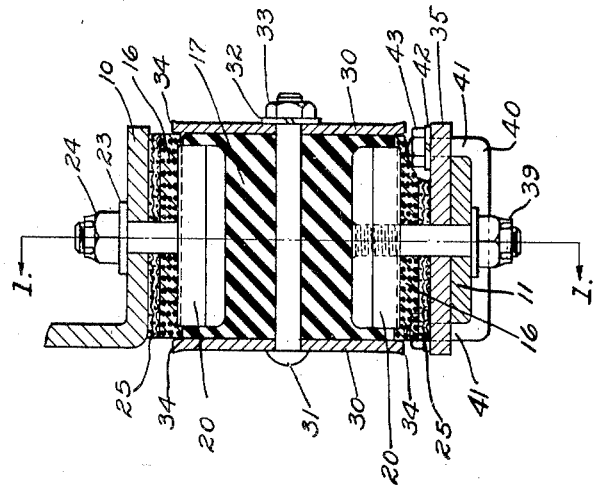
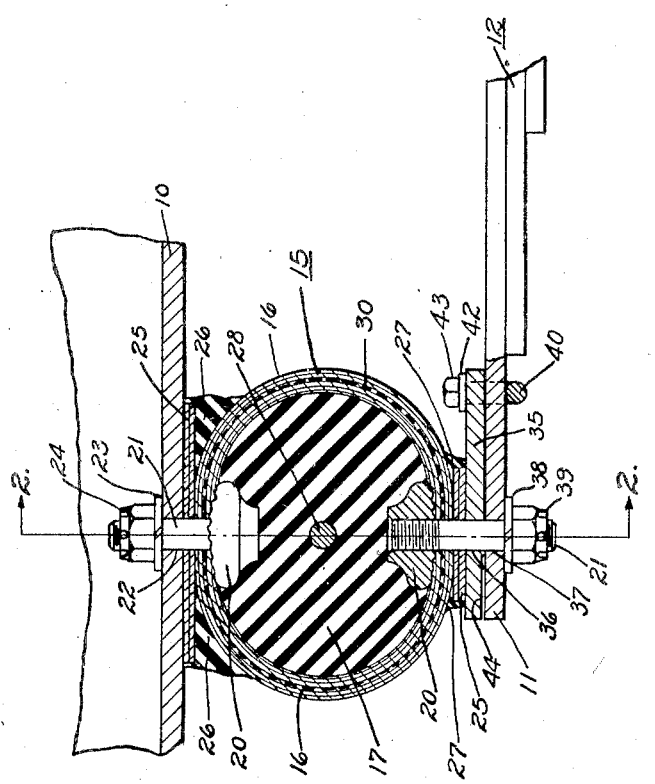

Patented Dec. 10, 1929

1,739,025

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

SPRING SHACKLE

Application filed March 29, 1927. Serial No. 179,360.

This invention relates to flexible coupling members, especially such as are adapted for use as spring shackles on vehicles.

An object of this invention is to provide an improved form of flexible coupling having the advantages of economy of manufacture and assembling in place upon the parts connected thereby, efficiency of operation, and long life in use.

A more specific object is to provide a coupling member of elastic rubber and flexible rubberized fabric composition wherein the elastic rubber is confined on its sides by retaining plates, therey permitting the use of a softer elastic rubber and a consequent more flexible molded unit. Another advantage of the lateral retaining plates is that the lateral movement or "side sway" between the parts connected by the coupling is minimized.

Another object is to provide a simple and efficient connection between the coupling and the end of the long leaf of the spring which permits the spring leaf to be pierced but prevents tendency of the leaf breaking at the pierced section.

Further objects and advantages of the present invention will be apparent from the following description, reference being had to the accompanying drawings wherein a preferred embodiment of one form of the present invention is clearly shown.

In the drawings:

Fig. 1 illustrates a shackle built according to this invention mounted on the rear end of the front spring of an automobile chassis. The vertical section is taken on line 1—1 of Fig. 2.

Fig. 2 is a section taken on line 2—2 of Fig. 1, a small portion being broken away to show the U-shaped clamping means more clearly.

Similar reference characters refer to similar parts throughout the drawings.

Numerals 10 and 11 designate the two relatively movable parts connected by the shackle, 10 being the chassis side rail or fitting rigidly secured thereto, and 11 the projecting end of the longest leaf of the spring 12.

The molded unit, indicated as a whole by 15, comprises an endless rubberized fabric band 16 which preferably is composed of a plurality of turns of rubberized cord fabric with the non-extensible cords thereof extending in a peripheral direction. This fabric band 16 filled with soft elastic rubber material 17 is molded in either a cylindrical form and flattened slightly by the compression under which it is put in use, or in a slightly flattened cylindrical form as clearly shown in Fig. 1. The molded in metal clamping inserts 20 have shanks 21, integral therewith or threaded thereto as clearly shown, projecting outwardly through the fabric band 16. Preferably relatively stiff rubberized fabric seats 25 are molded in place and the wedge-shaped spaces 26 and 27 between the seats 25 and the band 16 are filled with soft elastic rubber molded in place. Preferably these fabric seats 25 are molded originally so that they are concave outwardly, but when clamped in place upon the metal seats they flatten out under the pressure and snugly hug the metal seats. In Fig. 1, the upper fabric seat 25 is of greater longitudinal dimension than the lower seat in order to insure that no rocks, gravel, or other foreign matter may find lodgment between the band 16 and member 10 and cause damage to the molded unit. A transverse central aperture 28 is molded in the elastic rubber block 17.

This molded unit 15 is vulcanized as a whole in the molding die, the desired degree of softness of the rubber in the various portions thereof being determined by the amount of sulphur in the unvulcanized rubber composition used in the various portions of the mold. By this means the soft rubber portions 26 may be made softer than the elastic rubber 17 in order to permit a very free rolling movement of the cylindrical unit during the to and fro movement of the spring end. Since the soft rubber portions 27 are small and are not greatly deformed during such rolling movement, these portions 27 are preferably of somewhat harder elastic rubber than the portions 26.

After the unit 15 is removed from its vulcanizing mold, the two metal side plates 30 are applied thereto and held clamped in place by the transverse bolt 31 with lock washer 32 and nut 33. Preferably these side plates 30 are of such contour that they slightly over-lap the edges of the flexible cord-fabric casing 16 when unit 15 is slightly flattened by the normal compression in use, as clearly illustrated. The marginal edges 34 of plates 30 are preferably flared outwardly slightly from casing 16 in order to reduce frictioning thereupon during to and fro movement of the spring end and so facilitate such movement but at the same time to properly confine the soft rubber block 17 against lateral bulging under the compression under which it is put.

In assembling this molded unit 15 in place, a metal seat 35 of greater lateral width than leaf 11 is laid upon the projecting end 11 of the long leaf. The lower shank 21 of the clamping insert 20 is passed through registering holes 36 and 37 in seat 35 and leaf 11 respectively, and the lock washer 38 and nut 39 applied. When nut 39 is drawn up very tight, the clamping insert 20 clamps the fabric casing 16 down tightly upon the seat 35. Preferably a U-bolt 40, or its equivalent, is used to clamp the other end of seat 35 down upon the leaf 11. The shanks 41 of U-bolt 40 extend up around the sides of leaf 11 and through holes or slots in the laterally projecting portions of seat 35 and have lock washers 42 and nuts 43 applied thereto. Preferably the underside of the tip of seat 35 is ground off, as shown at 44, to provide a clearance between seat 35 and leaf 11 and thus prevent any down load upon the end of leaf 11. This greatly reduces the bending moment upon leaf 11 at the section where it is weakened by hole 37 and so eliminates any possibility of the leaf 11 breaking at this point due to a bending load. The outer end of seat 35 thus supports the down load of the shackle by cantilever action and any tendency of seat 35 to tip up at its other end is prevented by the U-bolt 40. Also it will be obvious that this construction greatly strengthens the spring end when the shackle is under tension (such as may occur during rebound of the car body) since there is no possibility of any substantial bending moment upon leaf 11 between U-bolt 40 and the end of leaf 11.

Furthermore by providing seat 35 of greater width than leaf 11, the lateral width of the molded unit 15 may be made as great as desired since it will not be limited to the width of leaf 11. Of course the upper seat 10 can easily be made any desired width.

The upper shank 21 is passed through a hole 22 in the member 10 and has a lock washer 23 and nut 24 applied thereto and tightened to firmly clamp the upper portion of casing 16 in place. Preferably the hole 22 is so located relative to the hole 37 in the spring leaf 11 that these holes will be in substantial vertical alignment when the spring 12 is deflected by the normal load of the car body. This position is illustrated in Fig. 1.

In operation, the flexible casing 16 and the soft elastic rubber 17 is easily distorted to permit the desired longitudinal movement of the spring end 11 when spring 12 is flexed. The soft rubber 17 being confined by the plates 30 cannot bulge out laterally, but easily takes the form of the distorted casing 16. Also the soft rubber 17 during such distortion absorbs a large percentage of the energy causing the distortion and thus tends to damp out small vibrations and to materially reduce the rebound of large vibrations, thereby giving easier riding.

While the form of embodiment of the present invention as herein disclosed, constitutes a preferred form, it is to be understood that other forms might be adopted, all coming within the scope of the claims which follow.

What is claimed is as follows:

1. An extension shackle connecting two relatively movable members, said shackle comprising: an elastic non-metallic swinging element having opposite portions connected respectively to said movable members, a relatively rigid retaining wall on each side of said swinging element, and tie means extending laterally through said element for clamping said retaining walls in place.

2. An extension shackle connecting two relatively movable members, said shackle comprising: an elastic non-metallic swinging element having opposite portions connected respectively to said movable members, a metal plate on each side of said swinging element and tie means extending laterally through said element for clamping said plates against said element, said plates being isolated from both of said movable members by said non-metallic element.

3. An extension shackle connecting two relatively movable members, said shackle comprising: a molded elastic rubber and fabric swinging element having end portions clamped respectively to said movable members, a metal wall on each side of said element and tie means extending through said element for holding said walls in place, said walls being isolated from both of said movable members by said rubber and fabric element.

4. An extension shackle connecting two relative movable members, said shackle comprising: a flexible rubberized fabric casing, having opposite portions connected respectively to said movable members, an elastic rubber block within said casing and vulcanized thereto, a metal plate on each side of rubber block for confining the elastic rubber on the lateral sides thereof, and tie means extending through said rubber block for retaining said plates in place.

5. An extension shackle connecting two relatively movable members, said shackle comprising: a flexible rubberized fabric casing having opposite portions connected respectively to said movable members, an elastic rubber block within said casing and vulcanized thereto, a metal plate on each side of rubber block for confining the elastic rubber on the lateral sides thereof, and tie means extending through said rubber block for retaining said plates in place, said metal plates being isolated from both of said movable members by said elastic rubber.

6. A shackle for connecting two relatively movable members comprising: a flexible rubberized fabric casing of flattened cylindrical form having opposite flattened portions thereof connected respectively to said movable members, an elastic rubber block within said casing and vulcanized thereto, a metal plate confining said rubber block at each end of said fabric casing, said metal plates being isolated from both of said movable members.

7. A shackle for connecting two relatively movable members comprising: a flexible rubberized fabric casing of flattened cylindrical form having opposite flattened portions thereof connected respectively to said movable members, an elastic rubber block within said casing and vulcanized thereto, a metal plate confining said rubber block at each end of said fabric casing, and means passing laterally through said rubber block for retaining said plates in place.

8. A shackle for connecting two relatively movable members comprising: a flexible rubberized fabric casing of flattened cylindrical form having opposite flattened portions thereof connected respectively to said movable members, an elastic rubber block within said casing and vulcanized thereto, a metal plate confining said rubber block at each end of said fabric casing, said plates extending over the edges of said fabric casing but having a clearance with said movable members.

9. A shackle for connecting two relatively movable members comprising: a flexible rubberized fabric casing of flattened cylindrical form having opposite flattened portions thereof connected respectively to said movable members, an elastic rubber block within said casing and vulcanized thereto, a metal plate confining said rubber block at each end of said fabric casing, said metal plates being isolated from both of said movable members, and a tie member extending through the central portion of said rubber block for retaining said plates clamped in position.

10. A shackle for connecting two relatively movable members comprising: a molded flexible rubber and fabric element having opposite portions thereof connected respectively to said movable members, a metal plate confining said flexible element on each side thereof, and tie means interconnecting said plates and extending through said flexible element.

11. In combination, a leaf spring having a long leaf projecting beyond the other leaves, a molded flexible rubber and fabric shackle unit of greater width than said long leaf and secured to the outer end thereof, a metal shackle seat member for said rubber shackle unit resting upon the projecting end of said long leaf and having greater width than said leaf end, clamping means extending around said leaf and through recesses in the projecting edges of said seat member for rigidly clamping said seat member to said leaf, and a metal shank extending from said flexible shackle unit and passing through said seat member and long leaf outwardly of said clamping means for fixing said parts together.

12. In combination, a leaf spring having a long leaf projecting beyond the other leaves, a metal shackle seat member resting upon the projecting end of said long leaf, but having its outer portion overlying but clearing said leaf, a shackle seated partially upon said overlying outer portion of said seat member, and clamping means for clamping the inner end of said seat member to said leaf, whereby said seat member is prevented from tilting.

13. In combination, a leaf spring having a long leaf projecting beyond the other leaves, a metal shackle seat member resting upon the projecting end of said long leaf, but having its outer portion overlying but clearing said leaf, a shackle seated upon said overlying outer portion of said seat member, and a clamping means for clamping the inner end of said seat member to said leaf, whereby said seat member is prevented from tilting, said clamping means engaging the underside of said leaf and extending around the sides thereof to avoid piercing of the leaf.

In testimony whereof I hereto affix my signature.

RALPH H. CHILTON.